United States Patent [19]

Dohmen et al.

[11] Patent Number: 4,706,146
[45] Date of Patent: Nov. 10, 1987

[54] MAGNETIC HEAD WITH CONCAVE CONTACT FACE

[75] Inventors: Gerardus M. Dohmen; Jacob G. Fijnvandraat; Budiman Sastra, all of Eindhoven, Netherlands

[73] Assignee: U.S. Philips Corporation, New York, N.Y.

[21] Appl. No.: 775,200

[22] Filed: Sep. 12, 1985

[30] Foreign Application Priority Data

Sep. 13, 1984 [NL] Netherlands ......................... 8402798
Oct. 8, 1984 [NL] Netherlands ......................... 8403053

[51] Int. Cl.$^4$ ............................................. G11B 5/187
[52] U.S. Cl. .................................................... 360/122
[58] Field of Search ......... 360/122, 110, 119, 125–127

[56] References Cited

U.S. PATENT DOCUMENTS 3,663,767  3/1972  Shimotori et al. ................... 360/122
4,531,170  7/1985  Takei et al. ......................... 360/122

FOREIGN PATENT DOCUMENTS 215716  12/1983  Japan ................................... 360/122
16119   1/1984   Japan ................................... 360/122
776348  6/1957   United Kingdom ............... 360/122

OTHER PUBLICATIONS

Brock et al., "Magnetic Head Structure", IBM TDB, Nov. 1975, vol. 18, No. 6, p. 1743.

Primary Examiner—Stuart N. Hecker
Assistant Examiner—David J. Severin
Attorney, Agent, or Firm—F. Brice Faller

[57] ABSTRACT

A magnetic head has a contact face (2) for a magnetic tape which can be moved in a direction (V) along the face (2). A transfer gap (3) lies in a region (6) of the contact face (2), which is curved into a concave shape in the direction of movement (V). On either side of this region (6) there are located regions (7, 8) curved into a convex shape in the direction of movement (V). The contact face (2) is curved into a convex shape transverse to the direction of movement (V). Due to the shape of the contact face (2), an information carrier exerts only a low pressure on and near the transfer gap (3), as a result of which the degree of wear is low at this area and the life of the magnetic head is long.

2 Claims, 8 Drawing Figures

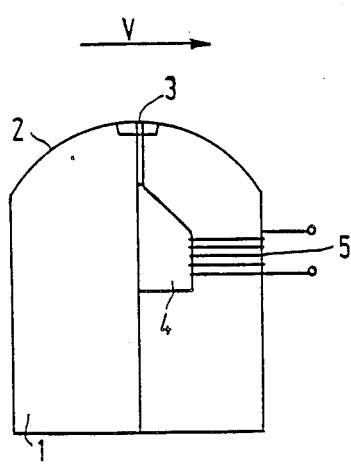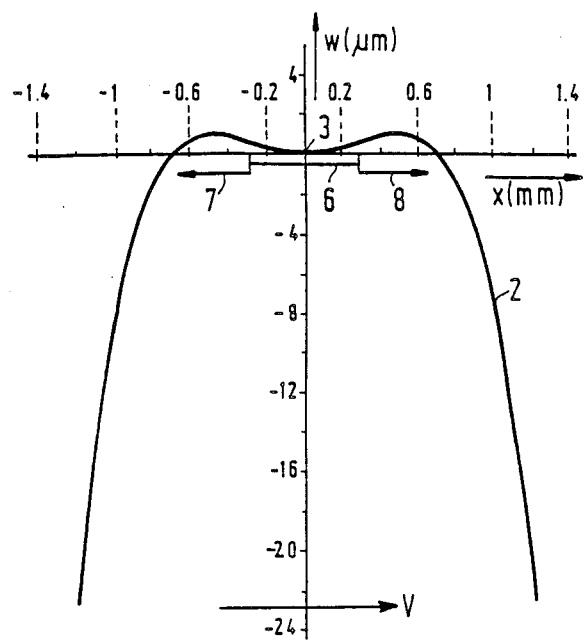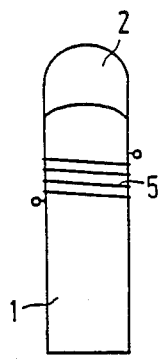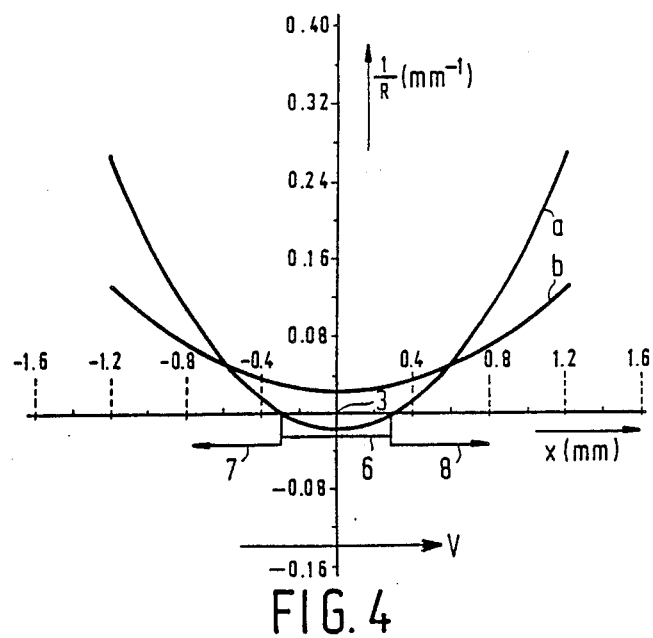
FIG. 1
FIG. 2
FIG. 3
FIG. 4

MAGNETIC HEAD WITH CONCAVE CONTACT FACE

The invention relates to a magnetic head for recording, reproducing and/or erasing magnetic information in a track of a flexible magnetic tape. A magnet core is provided with a contact face along which the tape is moved in contact with the magnetic head in a predetermined direction of movement, and with a nonmagnetic transfer gap which intersects the contact face, which contact face is curved in the direction of movement on either side of the transfer gap in accordance with a radius of curvature whose value depends upon the distance from the transfer gap. Such a magnetic head is known from British Patent Application No. 8200667, now G.B. Pat. No. 2091475.

The known magnetic head has a contact face whose radius of curvature has a maximum value at the area of the transfer gap and is smaller at areas more remote from this gap. The curvature of the contact face results in the contact pressure of the tape being small at the area of the transfer gap. Consequently, the degree of wear of the magnetic head at this area is reduced and the life of the magnetic head is lengthened.

This curvature of the contact face of the known magnetic head has proved to be very effective for reducing the degree of wear in the case where the width of the tape does not exceed the width of the contact face (the dimension transverse to the direction of movement), which is the case in audio applications.

However, where the tape has a width exceeding that of the contact face of the magnetic head and is very flexible, as is the case in video applications, a comparatively high degree of wear of the magnetic head is still found to occur at the area of the transfer gap, although this degree of wear is considerably less than with a contact face circularly curved in the direction of movement.

SUMMARY OF THE INVENTION

The magnetic head of the present invention is even less susceptible to wear at the area of the transfer gap if it is used with a flexible tape having a width larger than the dimension of the contact face of the magnetic head transverse to the direction of movement and which consequently bends laterally around the magnetic head.

In a region of the contact face in which the transfer gap is located, the radius of curvature with which the contact face is curved in the direction of movement increases with an increasing distance from the transfer gap; the centers of curvature lie above the surface of the contact face in order to form a concave surface. In the regions of the contact face adjoining the region in which the transfer gap is located, this radius of curvature decreases with increasing distance from the transfer gap; the centers of curvature are located below the surface of the contact face in order to form convex surfaces. The contact face is curved convexly transverse to the direction of movement.

It is of importance for recording and for reproducing magnetic information with a minimum loss of signal, that near the transfer gap the distance between the magnetic head and the tape is a minimum. During operation of the magnetic head according to the invention, this distance on the contact surface is smaller than about thrice the overall roughness of the contact face and the information carrier. The magnetic head is therefore a magnetic head of the contact type.

Due to the contact between the tape and the contact face of the magnetic head, wear of the contact face occurs if the tape is moved along this surface. The tape and the magnetic head need only move with respect to each other and it is not important whether both of them or only one of them move relative to the "environment". The degree of wear is higher at a higher contact pressure.

With the use of a flexible information carrier or tape having a width exceeding that of the contact face of the magnetic head, an additional pressure is exerted by the tape on the contact face of the magnetic head. The additional pressure is due to a tensile stress which causes the tape to bend laterally around the magnetic head and leads to a higher degree of wear of this head at the area of the transfer gap. The additional pressure at the area of the transfer gap can be reduced while maintaining the contact at this area by curving the contact face in the direction of movement into a concave shape in a region in which the transfer gap is located, and by curving it in the direction of movement into a convex shape in the adjoining regions, provided that the contact face is curved transverse to the direction of movement into a convex shape.

It should be noted that it is known per se from British Patent Specification No. 1,009,591 (PHZ 18786) to curve the contact face of a magnetic head for video recording, which head has a uniform curvature in the direction of movement and into a convex shape transverse to said direction. This transverse curvature is necessary to ensure that the tape initially is in contact with the contact face not only along the edges, but also at the centre of the pole surface.

The shape of the contact face of the magnetic head according to the invention can vary qualitatively in dependence upon factors, such as the tensile stress in the tape, the diameter of the drum in which the magnetic head is included and which guides the tape, and the height over which the contact face of the magnetic head projects beyond the drum.

The convex surfaces of the contact face may be provided with a material having a higher resistance to wear than the magnetizable material in the immediate proximity of the transfer gap.

The magnetic head according to this embodiment, has the advantage of a very great difference in the pressure exerted by a tape in combination with a higher resistance to wear located within certain regions. Within the region of the convex surfaces pressure is high and at the area of the gap pressure is low compared to known magnetic heads having an initially circular profile in which the rate of wear is initially high at the area of the gap decreasing to a low rate of wear at the stage of uniform rate of wear with an unvarying profile, the rate of wear of this magnetic head is initially very low at the area of the gap and then slowly increases to the same low rate of wear that occurs with an initially circular profile. The low rate of wear is reached at the stage of equilibrium of uniform rate of wear and unvarying profile. The advantage consequently becomes manifest in a lengthened life due to a low rate of wear in the initial period of the life.

Examples of wear-resistant materials that may be used in the convex surfaces of the contact face are hafnium nitride and tungsten carbide. These materials may be applied by sputtering or flame-spraying. Another possibility for applying wear-resistant materials is to attach bodies, for example bars, of these materials by means of glue, such as acrylate ester resin, on composite bodies, from which magnet cores are obtained by sawing slices therefrom.

It should be noted that it is known per se from the U.S. Pat. No. 3663767 herewith incorporated by reference to provide the contact face of a magnetic head on either side of and at a distance from the transfer gap with a nitride layer to diminish the abrasion of the contact face. This known magnetic head, however, does not show a contact face provided with a curvature according to the invention and consequently does not make use of the difference in the pressure executed by the information carrier. Therefore the effect of the layer on the lifetime of the magnetic head is comparatively small.

BRIEF DESCRIPTION OF THE DRAWING

FIG. 1 shows diagrammatically in side elevation a magnetic head according to the invention, FIG. 2 shows diagrammatically in front elevation the magnetic head of FIG. 1, FIG. 3 shows on a greatly enlarged scale the curvature of the contact face of the magnetic head of FIG. 1 in the direction of movement, FIG. 4 shows the variation of the radius of curvature of the magnetic head of FIG. 1 along the contact face in the direction of movement as compared with that of a known magnetic head.

DETAILED DESCRIPTION OF THE PREFERRED EMBODIMENT

Figure 5:
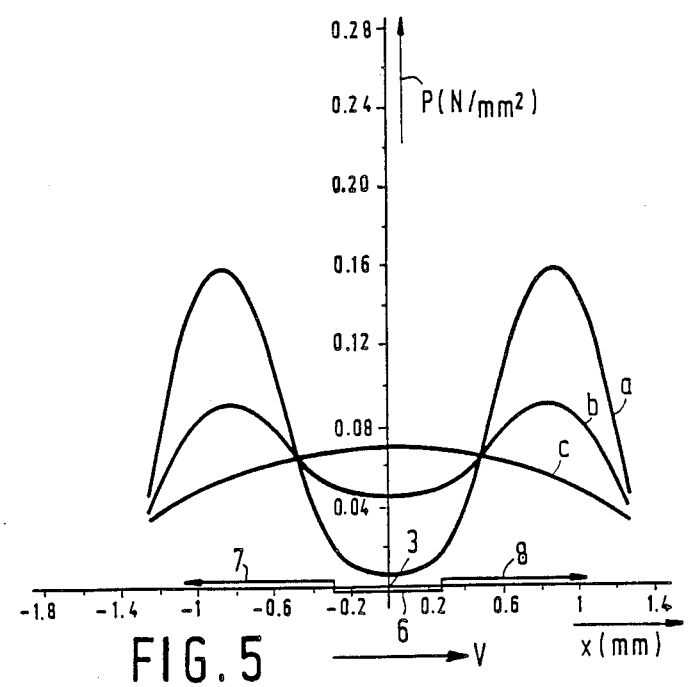
FIG. 5 shows the variation of the pressure on the contact face of the magnetic head of FIG. 1 as compared with that of magnetic heads having a known contact surface profile.

The magnetic head of FIGS. 1 and 2 for recording, reproducing and/or erasing magnetic information in a track of a flexible magnetic tape has a magnet core 1 of magnetizable material, for example of manganesezinc ferrite. The magnet core 1 has a contact face 2 along which the tape can be moved in a predetermined direction of movement indicated by the arrow V. A nonmagnetic transfer gap 3 intersects the contact face 2. The transfer gap is filled, for example, with acrylate ester resin. A coil chamber 4 is recessed in the magnet core 1 through which pass turns of wire 5.

The contact face 2 is curved in the direction of movement V with a radius of curvature whose value depends upon the distance from the transfer gap 3. The curvature of this contact face will be described further with reference to FIG. 3.

It will be seen from FIG. 2 that the contact face 2 is curved transverse to the direction of movement V into a convex shape.

The contact face 2 can be curved in the direction transverse to the direction of movement V according to one of a variety of curvatures, for example, into a circular or parabolic shape. With a circular curvature, the radius of curvature may have a value of one mm to several mms, for example, 1-3 mm.

The contact face may also have one of a variety of shapes in the direction of movement V. Examples of these shapes with y=constant, where y is the coordinate axis at right angles to x and w, satisfy the relation:

$$w(x) = w_0 + w_2 x^2 + w_4 x^4,$$

in which $w_2$ and $w_4$ have opposite signs.

In the profile of a contact face 2 shown on a greatly enlarged scale in FIG. 3, the curvature of the contact face satisfies the relation and at y=0: the coefficients are: $w_0=0$; $w_2=0.00814$ mm$^{-1}$; $w_4=-0.01657$ mm$^{-3}$. x is the distance of a point of the contact face in the direction of movement V from the transfer gap 3 and w is the height of such a point with respect to the transfer gap. The transfer gap merges at the point x=0, w=0 into the contact face. It should be noted that the transfer gap has a length, i.e. a dimension in the direction of movement V, of, for example, 0.2 or 0.3 μm.

It will be evident from FIG. 3 that in a region 6 of the contact face 2, in which the transfer gap 3 is located, the centers of curvature is located above the surface of the contact face 2 in order to form a concave surface. It is also evident that in the regions 7 and 8 of the contact face 2 which adjoin the concave region 6, the centers of curvature are located below the surface of the contact face 2 in order to form convex surfaces. The apices of the profile shown are located 1 μm above the surface of the gap 3.

In this connection, when considering FIG. 4, curve a, in which the reciprocal values of the radii of curvature are plotted against the distance x from the transfer gap 3, it appears that in the region 6 of the contact face in which the transfer gap 3 is located, the radii of curvature R have a negative value (that is to say that the centres of curvature are located above the surface of the contact face) and that the absolute value of the radii of curvature R increases with an increasing distance from the gap 3.

It further appears that in the regions 7 and 8 adjoining the region 6, the radii of curvature R have a positive value (the centers of curvature are located below the surface of the contact face) and that the radii of curvature decrease with an increasing distance from the transfer gap 3. The Figure shows that the absolute value of the radii of curvature R varies with the distance x from the gap 3.

For comparison, FIG. 4 shows the curve b of the magnetic head described in the British Pat. No. 2091475. The contact face of this magnetic head is curved according to the relation:

$$w(x) = w_2 x^2 + w_4 x^4$$

in which $w_2$ and $w_4$ have the same sign and in this case have the values 0.0525 mm$^{-1}$ and 0.0244 mm$^{-3}$, respectively. The radii of curvature are all positive. The centers of curvature are all located below the surface of the contact face and the contact face is curved solely into a convex shape.

In FIG. 5, curve a represents the pressure P which is exerted by a magnetic tape on the contact face of the magnetic head which is described with reference to the foregoing Figures. The magnetic head is included in a drum having a diameter of 65 mm and initially projects 50 μm above the surface thereof. The radius of the transverse curvature of the contact face is 3 mm. The tape is moved in the direction V in contact with the contact face and is subjected to a tensile force of 0.4N. Its bending strength is $16.4 \times 10^{-7}$ Nm and its width is 12.5 mm.

When curve a is examined, it appears that the contact pressure at the area of the transfer gap 3 and in its vicinity is very low, much lower than in the convex regions 7 and 8. As a result, the degree of wear of the contact face at the area of the transfer gap 3 and in its vicinity is very low and the life of the magnetic head is long.

Curve b represents for comparison the contact pressure across the known magnetic head as described with reference to FIG. 4b with the same transverse curvature as the magnetic head according to the invention and used under the same conditions.

Curve c indicates the contact pressure across a conventional magnetic head with a contact face which is circular in the direction of movement V, has the same transverse curvature as the two preceding magnetic heads, and is used under the same conditions.

Comparing curve b with curve c, the magnetic head with a curvature in the direction of movement V according to British Pat. No. 2091475 (curve b) has a considerably lower contact pressure on and immedu-ately adjacent the gap 3 than the conventional circular head. Comparing curve a with curve b, the contact pressure in the region 6 is considerably reduced with the magnetic head according to the invention with respect to the pressure in the corresponding region of the magnetic head of curve b. A very low pressure is exerted on the gap 3 and therefore at this area there is a very low degree of wear, but there is nevertheless contact. As a result, the head provides an information transfer of high quality and the head has a longer life.

Figures 6, 7:
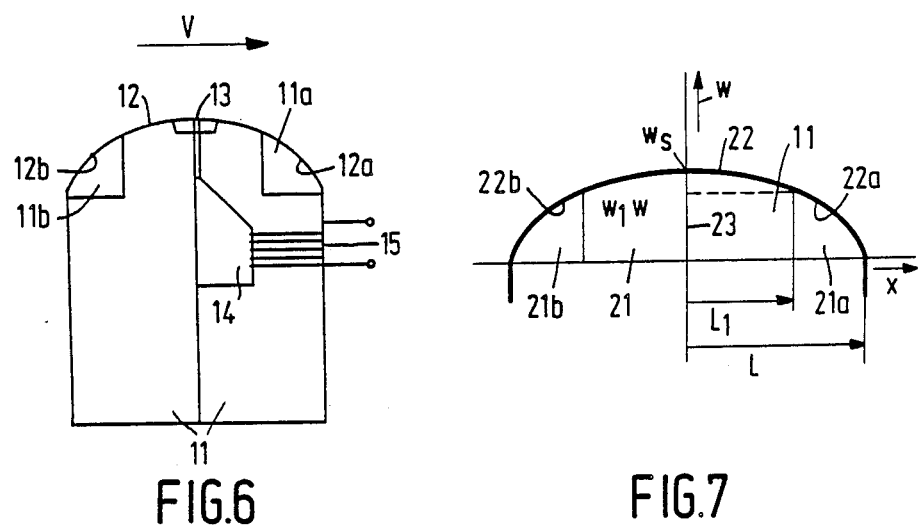
FIG. 6 shows diagrammatically in side elevation a second embodiment of the magnetic head according to the invention.
FIG. 7 shows the profile of a contact face of a conventional magnetic head.

Referring to FIG. 6, 2 magnetic tape can be moved in contact with the core 11 of a magnetic head along a contact face 12 in a predetermined direction of movement V. A non-magnetizable transfer gap 13 traverses the contact face 12, which is curved on either side of this gap. In the magnet core there is recessed a coil chamber 14, through which wire turns 15 are passed. Locally the magnet core 11 consists of parts 11a, 11b of a material having a higher resistance to wear arranged so that the contact face 12 at a certain distance from and on either side of the transfer gap is formed by surfaces 12a, 12b having a higher resistance to wear than the surface of the magnet core 11 in the immediate proximity of the transfer gap 13.

The insight on which the invention is based will be explained with reference to FIG. 7.

The curve 22 indicates in FIG. 1b the profile of the contact face of a conventional magnetic head, known for instance from U.S. Pat. No. 3663767. The transfer gap 23 coincides with the w-axis. The height of the gap is denoted by $w_s$. The contact face 22 is shown symmetrical about the w-axis. The distance of each point of the contact face from the gap 23 is plotted on the x-axis, while the relative height of each point with respect to the gap is plotted on the w-axis. In the immediate proximity of the transfer gap, where $|x| \angle L_1$, the contact face consists, for example, of ferrite (1) which is easily magnetizable, but has comparatively little wear-resistance (comparatively large wear factor $K_{21}$). On either side of and at a certain distance from the gap 23, the contact face 22a, 22b consists, where $L_1 \angle |x| \angle L$, of a wear-resistant material 21a and 21b, respectively. In this example material 21a is identical to material 21b. The wear factor of this material is $K_{21a}$, where, in view of the higher resistance to wear of material 21a, it holds that: $K_{21a} \angle K_{21}$.

The wear of the magnetic head becomes manifest in a decrease of w. The rate of wear amounts to:

$$dw/dt = K \cdot p \cdot V,$$

where
K = wear factor,
p = contact pressure between magnetic head and information carrier,
V = relative speed between magnetic head and information carrier.

For the contact, the wear and the information transmission, it is not important whether the magnetic head, the information carrier or both move with respect to the "earth". In the case of a contact face having a circular profile and an information carrier not wider than the contact surface of the magnetic head, it holds that:

$$p = T/R,$$

where $$T = \left[ \frac{\text{tensile force in information carrier}}{\text{width of information carrier}} \right]$$

R = radius of the contact face.

Since in the Figure, R is initially everywhere constant, p is initially constant over the whole contact face. However, the contact face consists of materials (on the one hand 21 and on the other hand 21a, 21b) having different resistances to wear so that initially there are different rates of wear ($K_{21a} \angle K_{21}$):

$$dw_{21}/dt = K_{21} \cdot p \cdot V \text{ in the range } |x| \angle L_1$$

$$dw_{21a}/dt = K_{21a} \cdot p \cdot V \text{ in the range } L_1 \angle |x| \angle L.$$

Initially, the region (21) in the immediate proximity of the gap is subjected to wear to the same extent as if the whole pole surface 22 had consisted of the same material. However, the rate of wear of this region soon decreases due to the fact that the region becomes flatter, the radius of curvature in this region consequently increases and therefore the pressure decreases..In fact:

$$dw_{21}/dt = K_{21} \cdot p \cdot V = K_{21} \cdot (T/R) \cdot V.$$

This deceleration of the rate of wear is a gain in life.

The variation of the profile of the contact face is terminated when a state of equilibrium is reached between the rate of wear in the region (21), in the immediate proximity of the gap, and in the regions (21a, 21b), at a certain distance from this gap. It then holds that:

$$\frac{dw_{21}}{dt} = K_{21} \cdot p \cdot V = \frac{dw_{21a}}{dt} = K_{21a} \cdot p_{21a} \cdot V, \text{ or } K_{21} \cdot p_{21} =$$

$$K_{21a} \cdot p_{21a}, \text{ or } \frac{K_{21}}{K_{21a}} = \frac{p_{21a}}{p_{21}} = \left[ \frac{1}{\beta} \right]$$

In this situation, the pressure $p_{21}$ in the immediate proximity of the gap 23 is low and the pressure $p_{21a}$ at a certain distance from the gap is high. The rate of wear of the contact face is uniform from that instant and is moreover low both in the immediate proximity of the gap due to the low pressure p21 and in spite of the low resistance to wear and at a certain distance from the gap due to the high resistance to wear, in spite of the higher pressure $p_{21a}$.

The force exerted by the information carrier on the contact surface is $$\bar{p} \cdot 2L \cdot b = p_{21} \cdot 2L_{21} \cdot b + p_{21a} \cdot 2(L-L_1) \cdot b,$$

where

L and L₁ are measured along the contact surface,
b = width contact face, $b = \perp x; \perp w$ and
$\bar{p}$ = average pressure on contact face.
The above relation can be rewritten as:

$$\bar{p} = p_{21}\frac{L_{21}}{L} + p_{21a}\left[\frac{L}{L} - \frac{L_{21}}{L}\right] \text{ and as:}$$

$$\bar{p} = p_{21}\left[\frac{L_{21}}{L} + \frac{p_{21a}}{p_{21}} \cdot \left(1 - \frac{L_{21}}{L}\right)\right]$$

If $\alpha = L_{21}/L$ and $\beta = K_{21a}K_{21}$, where $0 \angle \phi \angle 1$, and $0 \angle \beta \angle 1$, it holds that:

$$\bar{p} = p_{21}[\alpha + 1/\beta(1-\alpha)].$$

If $\alpha$ = TM (as in FIG. 2) and $\beta \angle \angle 1$ it follows that $p_{21}/p = 2\beta$.

At the stage of uniform wear rate of the contact face, the pressure p21 of the tape at the area of the transfer gap 23 is therefore a factor $2\beta$ smaller than in the case of a generally known magnetic head having a contact face wholly of the material 21 and having a circular profile. The life of the magnetic head at that stage of uniform wear rate is consequently, with a given gap height, a factor $\frac{1}{2}\beta$ greater than that of the generally known magnetic head with the same gap height.

If the magnetic head initially already has the profile of the stage of uniform wear the decrease of the gap height to the instant at which the minimum usuable gap height is reached, is very small.

Figure 8:
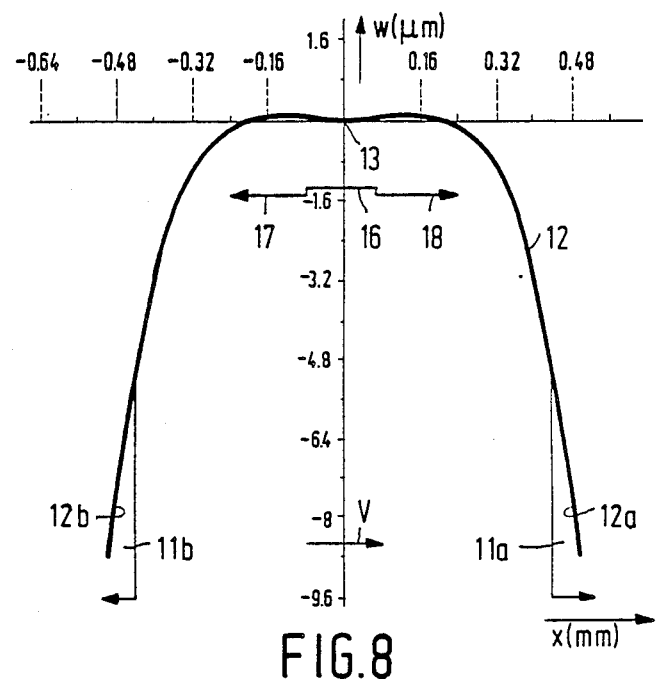
FIG. 8 shows the curvature of the contact face of the second embodiment of the magnetic head according to the invention in the direction of movement.

FIG. 8 shows in the same manner as in FIG. 3, but on a different scale, the profile of the second embodiment of a magentic head according to the invention. At y=0 the profile satisfies the relation:

$$w(x) = w_o + w_2 x^2 + w_4 x^4,$$

in which $w_o = 0$, $w_2 = 0.00687$ mm$^{-1}$ and $w_4 = -0.16862$ mm$^{-3}$. The transfer gap 13 lies in a region 16 of the contact face 12 curved into a concave shape. On either side of this region 16 there is located a region 17 and 18, respectively, curved into a convex shape. The apices of the profile are located 0.07 μm above the surface of the gap 13. The radius of the transverse curvature is 3 mm. The magnetic head has the moreresistant material (11a, 11b) within the convex regions 17 and 18 of the contact face 12 and is particularly suitable for use in a drum having a diameter of 40.0 mm, while it initially projects over a height of 30 μm above the surface thereof, with an information carrier having a bending strength of $12.0 \times 10^{-7}$ Nm and a width of 12.5 mm, which is moved under a tensile force of 0.15N in the direction of movement V in contact with the contact face. The pressure is very low at the area of the gap (13) and considerably higher within the convex regions. First the pressure in the convex regions 17 and 18 will decrease due to wear in situ before the pressure at the area 16 of the gap increases and a certain (though very small) amount of wear occurs at that area. The rate of wear within the convex regions is low, however, due to the high resistance to wear of the material (11a, 11b) within the convex regions. The magnetizable matetial of the magnet core (region 16) is chosen of its soft-magnetic properties, whereas its resistance to wear, though not wholly unimportant, is of lesser interest.

What is claimed is:

1. A magnetic head for recording, reproducing and/or erasing magnetic information in a track of a flexible magnetic tape, said head comprising a magnet core provided with a contact face along which the tape can be moved in contact with the magnetic head in a predetermined direction of movement, and with a non-magnetic transfer gap which intersects the contact face, which contact face is curved in said direction of movement on either side of the transfer gap in accordance with a radius of curvature whose value depends upon the distance from the transfer gap, the dimension of the contact face measured transverse to the direction of movement being less than the width of the tape, characterized in that in a region of the contact face, in which the transfer gap is located, the radius of curvature with which the contact face is curved in the direction of movement increases with an increasing distance from the transfer gap, and the centres of curvature lie above the surface of the contact face in order to form a concave surface;

in the regions of the contact face adjoining that region in which the transfer gap is located, this radius of curvature decreases with an increasing distance from the transfer gap, while the centres of curvature are located below the surface of the contact face in order to form convex surfaces; and the contact face is curved transverse to the direction of movement into a convex shape.

2. A magnetic head as claimed in claim 1, characterized in that the convex surfaces of the contact face are provided with a material having a higher resistance to wear than the magnetizable material in the immediate proximity of the transfer gap.

* * * * *